United States Patent [19]

Woodward et al.

[11] Patent Number: 4,987,014

[45] Date of Patent: Jan. 22, 1991

[54] CHILL ROLL PRINTING

[75] Inventors: Antony I. Woodward, Pulaski; Stephen M. Simpson, Clay, both of N.Y.

[73] Assignee: Felix Schoeller jr GmbH & Co. KG, Osnabrück, Fed. Rep. of Germany

[21] Appl. No.: 315,444

[22] Filed: Feb. 24, 1989

[51] Int. Cl.⁵ .......................... B05D 5/00; B05D 5/06
[52] U.S. Cl. .................................... 427/278; 118/249; 427/288; 427/428; 156/209
[58] Field of Search ................. 156/209, 553; 427/278, 427/288, 398.2, 428; 118/249

[56] References Cited

U.S. PATENT DOCUMENTS 3,948,709  4/1976  Ida et al. ............................. 156/209
3,959,546  5/1976  Hill ................................... 427/278 X
4,574,021  3/1986  Endres et al. ...................... 156/209 X Primary Examiner—Clifford D. Crowder
Attorney, Agent, or Firm—Horst M. Kasper

[57] ABSTRACT

A chill cylinder roll, disposed in-line and furnished with etched or engraved patterns or symbols on its surface, is employed during the extrusion coating. The pattern, to be transferred to the back side polyolefin coating, is characterized by an increase in height or, alternatively, a decrease in height of the surface level in certain areas of the chill cylinder roll, and which is further distinguished, as compared to the remaining cylinder-roll surface, by a different gloss. In particular, higher disposed surface parts of the chill cylinder roll, relative to the center axis of the roll, always exhibit a higher gloss.

23 Claims, 2 Drawing Sheets

CHILL ROLL PRINTING

BACKGROUND OF THE INVENTION

1. Field of the Invention

The invention relates to a method for the applying of patterns and symbols onto a polyolefin-coated imaging base paper.

2. Brief Description of the Background of the Invention Including Prior Art

The desired characters are conventionally applied with the aid of flexographic-printing or engraving-printing techniques onto the raw-base paper in order to be able to apply the names of the manufacturer or other characterizing features onto the back side of a polyolefin-coated imaging base paper and the printed side is then coated with a clear polyethylene.

In case of an absence of titanium dioxide in the back side polyolefin coating, the print picture appears clear and the overall required total opacity is achieved in general by the filling of the raw-base paper and a corresponding titanium dioxide addition into the polyethylene coating of the front face side. However, with some imaging base papers, there is required such a high opacity that a titanium dioxide addition is also required in the back side coating. However, based on this titanium dioxide addition, there occurs an interference with the legibility of the print picture.

In particular, two disadvantages occur when employing the conventional printing processes for this kind of characterizing and/or marking of base papers.

First, an automatic detection of defects and problems of the photographic paper becomes difficult with laser techniques, since these laser techniques can be influenced by the interference caused by the printed characters.

Second, the print characters can generate interfering effects relating to the final photographic picture, generated on the emulsion-coated side, based on photochemical reactions.

In addition, the use of conventional printing inks requires additional protective steps, which include avoiding or preventing a soiling and dirtying by the inks and suppressing an explosion danger associated with the solvent contained in the printing inks.

It has already been tried to characterize the polyolefin-coated photographic base paper by embossing. For this purpose, the polyethylene-coated paper was passed through a calender, where the roller of the calender was furnished with a specially structured surface. This way of operation has however proven to be unsuitable for this purpose, since no uniform stamping and impression depth could be achieved. In addition, the method required two separate operations, coating and stamping, which could not be performed in one single operational step.

In addition, a method exists in the art, where a chill cylinder roll, with a specially prepared surface, is employed for the application of different patterns or symbols onto the back side of a polyolefin-coated base paper, which chill cylinder roll allows the polyolefin-extrusion coating and the characterization in one single operational step, in-line.

This latter method is, for example, taught in the Japanese Patent JP No. 86-021,833, referenced for example in Agfa-Gevaert Fotobericht No. 23, 1988. The polyethylene is extruded through a slot between a pressure roll and a chill cylinder roll onto the carrier. The surface of the chill cylinder roll can be provided with different patterns, such as, for example, characters of all kinds, where the surface of the characters is distinguished by a different roughness than that of the chill cylinder roll itself.

A disadvantage of this method comprises that, during the later processing of the base paper, characterized according to this method and subsequently coated with photographic emulsion, there is observed a desensitization of the emulsion.

In addition, the legibility of the characters, obtained with the aid of the recited chill cylinder roll, is not particularly good.

It is a further disadvantage in the context of this method that the polyolefin coating mass obviously does not contain any titanium dioxide or other pigments, since pigmentation of the coating mass is desired in some photographic or reprographic products.

SUMMARY OF THE INVENTION

1. Purposes of the Invention

It is an object of the present invention to provide a method, which allows to produce an imaging base paper coated with polyolefin, which base paper is free of the above-recited disadvantages.

It is a further object of the present invention to provide a polyolefin-coated base paper, where the back side polyolefin coating, furnished with various patterns, does not have any effect on the front face side of the base paper coated with photographic layer.

These and other objects and advantages of the present invention will become evident from the description which follows.

2. Brief Description of the Invention

According to the invention, a chill cylinder roll, disposed in-line and furnished with etched or engraved patterns or symbols on its surface, is employed during the extrusion coating, whereby the pattern, to be transferred to the back side polyolefin coating, is characterized by an increase in height or, alternatively, a decrease in height of the surface level in certain areas of the chill cylinder roll, and which is further distinguished, as compared to the remaining cylinder-roll surface, by a different gloss. In particular, higher disposed surface parts of the chill cylinder roll, relative to the center axis of the roll, always exhibit a higher gloss.

A method for marking or printing onto a back side of a polyolefin-coated imaging base paper comprises mounting a pressure roll onto a machine frame. A chill cylinder roll has patterns or symbols etched into the surface of the chill cylinder roll. A height level and chill cylinder roll surface structure difference exists between the chill cylinder roll surface, on the one hand, and the patterns or symbols etched or engraved onto the chill cylinder roll surface, on the other hand. The height-level difference, measured at the chill cylinder roll, amounts to from about 3 to 8 micrometers. The chill cylinder roll is disposed on the machine frame in parallel to the pressure roll, thereby forming a nip between the pressure roll and the chill cylinder roll. Raw-base paper is passed through the said nip between the pressure roll and the chill cylinder roll. A polyolefin coating mass is brought as a film through said nip between the chill cylinder roll and the pressure roll onto the surface of the raw-base paper for generating simultaneously an image of the surface structure of the chill cylinder roll on the polyolefin coating. The chill cylinder roll surface structure difference causes a gloss difference of the coated paper between areas corresponding to the pattern on the chill cylinder roll surface and the surrounding areas of the chill cylinder roll surface. This gloss difference between the patterns, stamped into the polyolefin coating of the base paper and the area of the coating surrounding the patterns or symbols, is such that the higher disposed surface areas of the chill cylinder roll have a structure resulting in generation of a higher gloss level in first regions on the coated paper as compared to second regions of the coated paper corresponding to the lower disposed surface areas of the chill cylinder roll.

Preferably, the gloss difference between the first regions and the second regions on the coated paper amounts to about 20 to 60, but not less than 15, as measured with a measuring head under an angle of 60 degrees, or to from about 30 to 80, but not less than 25, as measured with a measuring head under an angle of 85 degrees, according to standard ASTM D 523.

The polyolefin coating mass forming said film can comprise polyethylene or polypropylene and may contain a pigment. The pigment can be any known pigment and is preferably selected from a member of the group consisting of titanium dioxide, carbon black, cobalt blue, any other colorant and mixtures thereof. The amount of titanium dioxide can be from 0 to 15 weight-percent of the polyolefin coating mass. The application amount of the polyolefin coating mass can amount to from about 20 to 60 g/sq.m.

The height level difference measured at the surface of the cylinder roll can amount to from about 3 to 8 micrometers.

Surprisingly, it has been found that the pattern or symbol stamped onto the back side polyolefin coating does not cause impressions on the front side of the coated base paper, where the pattern or symbol, stamped onto the back side polyolefin coating, maintains a certain height level and gloss difference between the chill cylinder roll surface, on the one hand, and the patterns or symbols etched or engraved, on the other hand, on the chill cylinder roll surface, and furthermore, where no fog, veil or desensitization effects can be observed in the photographic or reprographic layer(s) (imaging layers), applied later onto the front face side of the paper.

In addition, the invention effect is enhanced and increased in case of maintaining of a certain application amount of the polyolefin coating as well as maintaining of a certain pigment content in the coating.

The height-level difference according to the invention, as measured at the chill cylinder roll, amounts to from about 3 to 8 micrometers.

The gloss difference according to the invention is expressed by a gloss difference between the surface of the pattern or symbol, stamped into the polyolefin coating of the base paper, and the area of the coating surrounding the pattern or symbol, which gloss difference cannot be less than 15, as measured with a measurement head with a measurement geometry of 60 degrees, or less than 25, as measured with a measurement head with a measurement geometry of 85 degrees. A preferred gloss difference can run in the region of from 20 to 60, in case of a measurement angle of 60 degrees, or 30 to 80, in case of a measurement angle of 85 degrees.

The application amount of the polyolefin coating mass, according to the invention, amounts to 20 to 60 g/sq.m., and the titanium dioxide content in this coating mass amounts to 0 to 15 weight-percent. The preferred application amount of the polyolefin on the raw-base paper amounts to 25 to 50 g/sq.m.

No technical problems relative to a fixed adhesion of polyethylene particles at the chill cylinder roll surface during the coating were observed when work was performed according to the present invention.

Polyethylene can be employed both in its low-density, LD, or its high-density, HD, modification, and, alternatively, polypropylene can be employed, for obtaining a polyolefin coating of imaging base papers.

Titanium dioxide can be employed in its rutile or anatase modification, as well as other coloring pigments, such as carbon black or cobalt blue, for the pigmenting of the polyolefin coating mass.

The novel features which are considered as characteristic for the invention are set forth in the appended claims. The invention itself, however, both as to its product and its method of operation, together with additional objects and advantages thereof, will be best understood from the following description of specific embodiments and examples when read in connection with the accompanying drawing.

BRIEF DESCRIPTION OF THE DRAWING

In the accompanying drawing, in which are shown several of the va ious possible embodiments of the present invention.

DESCRIPTION OF INVENTION AND PREFERRED EMBODIMENT

Figure 1:
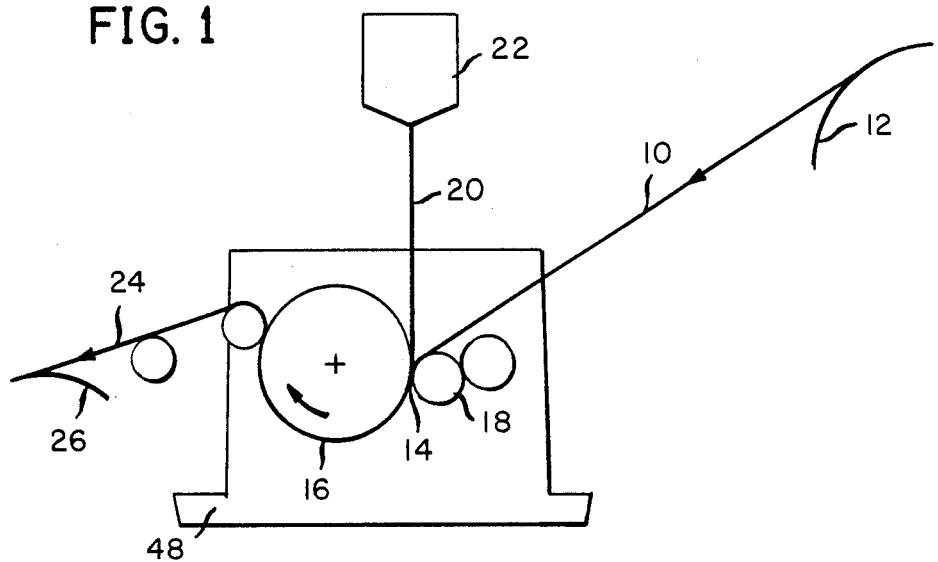
FIG. 1 is a side elevational view of a device of an apparatus for the production of polyolefin-coated imaging base papers.

FIG. 1 represents a schematic view of a conventional plant for extrusion coating. Similar plants have been described, for example in the U.S. Pat. No. 3,959,546. As can be recognized from FIG. 1, rolled imaging base paper 10 of a defined width is removed from a storage roller 12 through a nip 14, which is formed by the chill cylinder roll 16 and a pressure roll 18. The chill cylinder roll 16 is mounted in a machine frame 48. The continuous sheet of imaging base paper 10 passes through the nip 14. The pressure generated between the pressure roll 18 and the chill roll 16 amounts to from about 25 to 300 lbs/in. linear pressure. The temperature of the chill cylinder roll 16 can be from about 10 to 40 degrees centigrade and preferably amounts to about 70° F. or about 20° C.

A method for the marking or printing of the back side of a polyolefin-coated imaging base paper comprises that a polyolefin coating mass is brought as a film through a nip between a chill cylinder roll, with patterns or symbols etched into the surface of the chill cylinder roll, and a pressure roll onto the surface of the raw-base paper and simultaneously an image of the surface structure of the chill cylinder roll is obtained. A height level and a gloss difference exists between the chill cylinder roll surface, on the one hand, and the patterns or symbols etched or engraved onto the chill cylinder roll surface, on the other hand. The height-level difference, measured at the chill cylinder roll, amounts to from about 3 to 8 micrometers. The gloss difference is expressed by a gloss difference between the patterns stamped into the polyolefin coating of the base paper and the area of the coating surrounding the patterns or symbols. The higher disposed surface parts of the chill cylinder roll are always associated with a higher gloss.

The gloss difference between the coated surface and the patterns or symbols stamped thereon amounts to not less than 15, measured with a measuring head with an angle of 60 degrees, or to not less than 25, measured under an angle of 85 degrees, according to standard ASTM D 523. The preferred gloss difference can be in a region of from 20 to 60, as measured under an angle of 60 degrees, or in the region of 30 to 80, as measured under an angle of 85 degree.

The polyolefin coating mass can contain at least a polyethylene or a polypropylene and a pigment. The pigment can be selected from a member of the group consisting of titanium dioxide, carbon black, cobalt blue, other colorants, and mixtures thereof. The amount of titanium dioxide can be from 0 to 15 weight-percent of the polyolefin coating mass. The application amount of the polyolefin coating mass can amount to from about 20 to 60 g/sq.m.

An apparatus for marking a back side of a polyolefin-coated imaging base paper comprises a machine frame, a supply roller providing continuous raw-base paper, a pressure roll and a chill cylinder mounted onto the machine frame. The chill cylinder roll has patterns or symbols etched into the surface of the chill cylinder roll. A height level and chill cylinder roll surface structure difference exists between the chill cylinder roll surface, on the one hand, and the patterns or symbols etched or engraved onto the chill cylinder roll surface, on the other hand. The height-level difference, measured at the chill cylinder roll, amounts to from about 3 to 8 micrometers. The chill cylinder roll is disposed on the frame in parallel to the pressure roll, thereby forming a nip between the pressure roll and the chill cylinder roll. A winding roller is disposed in parallel relative to the chill cylinder roll. The winding roller pulls raw base paper from the supply roller through the said nip between the pressure roll and the chill cylinder roll and brings a polyolefin coating mass as a film through said nip between the chill cylinder roll and the pressure roll onto the surface of the raw base paper for generating simultaneously an image of the surface structure of the chill cylinder roll on the polyolefin coating. The chill cylinder roll surface structure difference causes a gloss difference of the coated paper between areas corresponding to the pattern on the chill cylinder roll surface and the surrounding areas of the chill cylinder roll surface. This gloss difference, between the patterns stamped into the polyolefin coating of the base paper and the area of the coating surrounding the patterns or symbols, is such that the higher disposed surface areas of the chill cylinder roll have a structure resulting in generation of a higher gloss level in first regions on the coated paper as compared to second regions of the coated paper corresponding to the lower disposed surface areas of the chill cylinder roll.

An imaging base paper comprises a center raw-base cellulose paper. A front layer of polyolefin is laminated to the front side of the center raw-base cellulose paper. A rear layer of polyolefin is laminated to the rear side of the center raw-base cellulose paper having areas of a higher gloss level in first regions of the rear side of the imaging base paper and having areas of a lower gloss level in second regions of the rear side of the imaging base paper surrounding the first regions.

An amount of from about 20 to 60 grams of polyolefin per square meter can form the rear layer. The thickness of the coated polyolefin in the first regions can be at least about 10 percent higher as compared to the second regions for providing a uniform level of defects in the interface between rear layer of polyolefin and raw-base paper.

The polyethylene film 20 is extruded from the extruder 22 into the nip 14, whereby it simultaneously attaches and adheres with the one surface at the paper and receives on the other surface an image of the surface structure of the chill cylinder roll 16.

Figure 3:
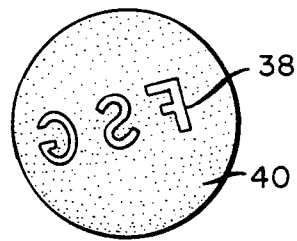
FIG. 3 is a top planar view onto a part of the surface of the chill cylinder roll employed according to the invention method.

The surface of the chill cylinder roll is shown in FIG. 3. The surface of the pattern 38 placed onto the chill cylinder roll 16 exhibits a higher gloss as compared to the area 40 surrounding the pattern 38.

The coated imaging base paper 24 is removed from the chill cylinder roll 16 and is led to a winding device 26.

Figure 2:
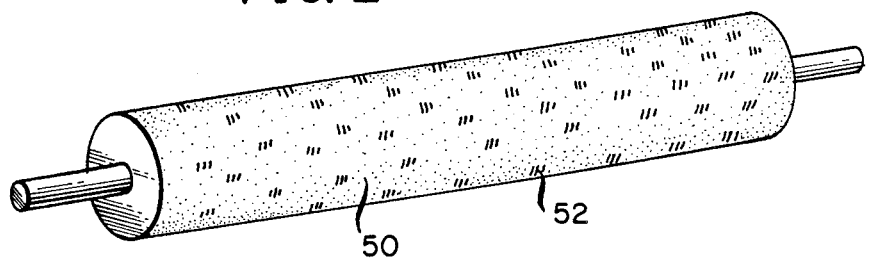
FIG. 2 is a perspective view of the chill cylinder roll employed according to the present invention, illustrating schematically delineation of a possible raised surface with higher gloss.

The markings to be provided on the imaging paper can be distributed over the chill cylinder roll 16 as desired and a perspective view of such a pattern 52 on a chill cylinder roll 50 is illustrated in FIG. 2. In particular, FIG. 2 provides a multiply repeated pattern 52.

Figure 4:
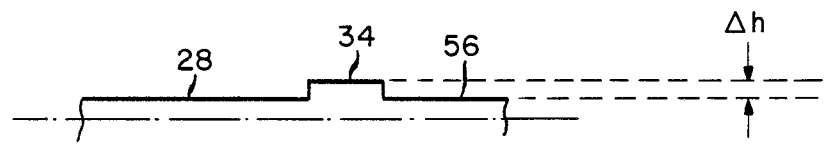
FIG. 4 is a partial sectional view of a chill cylinder roll employed according to the present invention, illustrating a raised surface with higher gloss.
Figure 5:
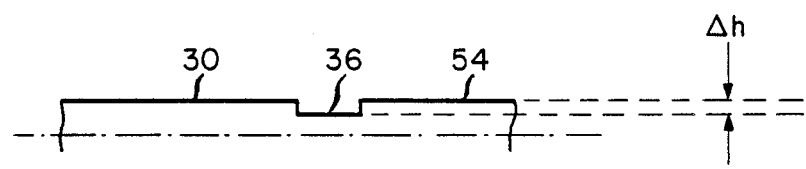
FIG. 5 is a partial sectional view of a chill cylinder roll employed according to the present invention, illustrating a recessed surface section with relatively lower gloss.

FIGS. 4 and 5 show a part of a section through an individual pattern. The invention height level difference between the glossy outer surface 34, 54 and the low-luster more inwardly disposed surface 36, 56 is designated as delta h. The outwardly disposed surfaces exhibit a higher gloss and luster than the other parts of the chill cylinder roll.

Figure 6:
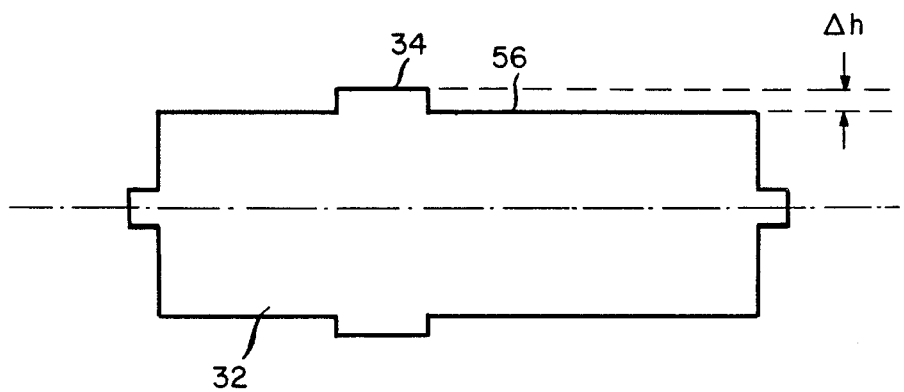
FIG. 6 is a sectional and dimensionally distorted schematic view of a chill cylinder roll employed according to the present invention, illustrating a raised surface with higher gloss.

The structuring of the chill cylinder roll surface 28, 30, 32 can be generated in various ways, for example, by etching of the surface of a steel cylinder outside of the area of the pattern face, which results in a surface structure having an increase in the pattern or a hump versus the remaining surface, compare FIGS. 4 and 6. Alternatively, a method can be employed where the resulting pattern is visible as a recess, representing the more inwardly disposed surface 36 on the cylinder surface, compare FIG. 5. It is noted that FIG. 6 is substantially a distorted view, as the height of the raised area is dimensionally illustrated much higher as compared relative to the remaining dimensions of this FIG. 6. The processing of the chill cylinder roll surface can be performed by a variety of methods, such as for example the method described in the U.S. Pat. No. 3,300,286. After the etch process, the chill cylinder roll is chrome-plated.

It is important that the outer surface of the chill cylinder roll relative to the chill cylinder roll axis is a surface of high gloss. A low gloss or low luster surface is disposed on the chill cylinder roll at a level close to the chill cylinder roll axis. The difference in the outer radius of the high gloss outer surface and of the low luster surface can be from about 3 to 8 micrometers, and preferably from about 3 to 6 micrometers. The level of measurement of the respective layers is the outer level of the surface, that is, in case of a rough or low luster surface, the top part of said layer.

EXAMPLE 1

A raw-base paper, produced in a conventional manner with a basis weight of 175 g/sq.m., was fed through a laboratory extrusion plant, schematically illustrated in FIG. 1, with a chill cylinder roll, of the type A (Table 2), as illustrated in FIGS. 2 and 3. A mixture of about 74% polyethylene with a density of 0.950 g/cm³, of type Alathon 7250, manufacturer DuPont de Nemours & Co., Wilmington, Del., and 26% titanium dioxide/-polyethylene-Masterbatch, type XEC-8457, manufacturer Nortech Corp., was extruded and laminated to the paper using a linear pressure of about lbs/in. in the nip. The polyethylene coating weight was 50 g/sq.m. The raw-base paper coated in this manner was subsequently tested according to the methods described. The results are illustrated in Table 1.

EXAMPLE 2

Raw-base paper with different basis weights (see Table 1) were fed through a laboratory extrusion plant, schematically illustrated in FIG. 1, with a chill cylinder roll, of the type B (Table 2), illustrated in FIG. 3. The same mixture as employed in Example 1 was used for the extrusion coating. The amount of the polyethylene coating weight varied from 18 to 50 g/sq.m. The results of the test are illustrated in Table 1.

EXAMPLE 3

A raw-base paper with a basis weight of 175 g/sq.m. was fed through a laboratory extrusion plant, schematically illustrated in FIG. 1, with a chill cylinder roll, of the type C (Table 2), illustrated in FIG. 3. The remaining example conditions corresponded to those of Example 1. The test results are represented in Table 1.

EXAMPLE 4

A raw-base paper with a basis weight of 175 g/sq.m. was fed through a laboratory extrusion plant, schematically illustrated in FIG. 1, with a chill cylinder roll of the type D (Table 2). The remaining experimental conditions corresponded to those of Example 1. The results are illustrated in Table 1.

EXAMPLE 5 (COMPARISON EXAMPLE)

A raw-base paper with a basis weight of 175 g/sq.m., such as recited in Example 1, was coated with a polyethylene coating mass according to the method of Example 1. The chill cylinder roll was of the type E (Table 2) and corresponded closely to the cylinder applied according to the Japanese Patent Disclosure JP No. 86-21,833. The examples are illustrated in Table 1.

TEST METHODS FOR INVESTIGATING OF THE BASE PAPER COATED

According to the Invention

1. Sensitometric Investigations

Samples of the imaging base paper, coated with polyolefin according to the invention, in strips of a size of 9×20 cm, were brought into contact with a conventional photographic color paper, such that the side with the pattern stamped into the polyolefin coating was placed on the side of the color paper, which was coated with photographic emulsion.

The strip so applied was packed into black-inked polyethylene-coated sacks or bags, which were weighed with a weight of 15 kg and stored for a time of one week at 35° C. Then the samples were developed, unexposed, in order to determine the presence of a possible fog, veil or haze, and they were developed, exposed, in order to determine a possible desensitization of the emulsion.

2. Pressure Effect

Since polyolefin-coated imaging base paper is produced as a roll product, the pressure generated inside of the roll has to be taken into consideration. For this purpose, a sequence of investigations were performed with a laboratory press in order to test the possibility of a transfer of the pattern, stamped into the back side, onto the front side of the paper. The pressure applied in the laboratory press amounted to about 1.5 kg/sq.cm and would approximately correspond to a pressure to be expected inside of the roll.

3. Gloss Measurements

The investigations were performed with the Dr. Lange reflectometer by closely adhering to the standard ASTM D 523-78 relating to a standard test for a specular gloss. The measurement includes making comparisons with and between 60, 20 or 85 degrees geometries. The 60 degree geometry is useful for inter-comparing most specimens. The 85 degree geometry is used for comparing specimens for sheen or near grazing shininess. It is applied in particular when specimens exhibit low 60-degrees values of gloss, for example such values as lower than 10.

The specular gloss is the relative luminous reflectance factor of a specimen at the respective specular direction. The luminous reflectance factor is the ratio of the luminous flux reflected from, to that incident on, a specimen for specified solid angles.

The measurements were performed with a measurement head with a measurement geometry of 60° for standard glossy surfaces and 85° for low-luster surfaces.

TABLE 1

| | | | | TEST RESULTS | | | | |
|---|---|---|---|---|---|---|---|---|
| | Type of Chill Cylinder Roll | Basis Weight of Raw-Base Paper g/sq.m. | Application Amount of the Polyethylene Coating on the Back Side | Sensitometric Investigation | | Legibility of the Stamped Patterns | Transfer of the Pattern onto the Front Side | |
| | | | | | | | without Pressure Application | with Pressure Application |
| Example | | | | Fog or Veil Formation | Desensitization | | | |
| 1 | A | 175 | 50 | + | − | good | clear | very clear |
| 2a | B | 175 | 50 | − | − | good | hardly recognizable | clear |
| 2b | B | 175 | 18 | − | − | blurred | — | hardly recognizable |

TABLE 1-continued

TEST RESULTS

| Example | Type of Chill Cylinder Roll | Basis Weight of Raw-Base Paper g/sq.m. | Application Amount of the Polyethylene Coating on the Back Side | Sensitometric Investigation | | Legibility of the Stamped Patterns | Transfer of the Pattern onto the Front Side | |
|---|---|---|---|---|---|---|---|---|
| | | | | Fog or Veil Formation | Desensitization | | without Pressure Application | with Pressure Application |
| 2c | B | 114 | 49 | — | — | good | — | — |
| 2d | B | 114 | 18 | — | — | blurred | — | — |
| 2e | B | 127 | 38 | — | — | good | — | — |
| 2f | B | 127 | 18 | — | — | blurred | — | — |
| 3 | C | 175 | 50 | — | — | not good | — | — |
| 4 | D | 175 | 50 | — | — | good | — | — |
| Compar. Example | E | 175 | 50 | — | + | not good | — | — |

TABLE 2

Type of Chill Cylinder Roll Used

| Chill Cylinder Roll | Height Level Difference (micrometers) | Gloss Difference* | |
|---|---|---|---|
| | | at 60° | at 85° |
| A | 16 | 20 | 30 |
| B | 8 | 35 | 66 |
| C | 8 | 10 | 16 |
| D | 4 | 35 | 66 |
| E according to Japanese Patent JP 86-21,833 | 0 | 40 | 70 |

*The gloss difference is being determined for the paper.

It will be understood that each of the elements described above, or two or more together, may also find a useful application in other types of chill roll processing systems differing from the types described above.

While the invention has been illustrated and described as embodied in the context of a chill roll printing method for the applying of patterns and symbols onto a polyolefin-coated imaging base paper, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method for marking or printing onto a back side of a polyolefin-coated imaging base paper, comprising
    mounting a pressure roll onto a machine frame;
    mounting a chill cylinder roll, with patterns or symbols etched into the surface of the chill cylinder roll, where a height level difference and a chill cylinder roll surface structure difference exists between the chill cylinder roll surface, on the one hand, and the patterns or symbols etched or engraved onto the chill cylinder roll surface, on the other hand, whereby the height-level difference measured at the chill cylinder roll, amounts to from about 3 to 8 micrometers, onto the machine frame to be disposed in parallel to the pressure roll, thereby forming a nip between the pressure roll and the chill cylinder roll;
    passing raw base paper through the said nip between the pressure roll and the chill cylinder roll;
    bringing a polyolefin coating mass as a film through said nip between the chill cylinder roll and the pressure roll onto the back surface of the raw-base paper not to be covered with light sensitive layers for generating simultaneously an image of the surface structure of the chill cylinder roll on the polyolefin coating,
    and where the chill cylinder roll surface structure difference causes a gloss difference of the coated paper between areas corresponding to the pattern on the chill cylinder roll surface and the surrounding areas of the chill cylinder roll surface and where this gloss difference between the patterns, stamped into the polyolefin coating of the base paper and the area of the coating surrounding the patterns or symbols, is such that the higher disposed surface areas of the chill cylinder roll have a structure resulting in generation of a higher gloss level in first regions on the coated paper as compared to second regions of the coated paper corresponding to the lower disposed surface areas of the chill cylinder roll,
    wherein the gloss difference between the first regions and the second regions on the coated paper amounts to not less than 15, as measured with a measuring head under an angle of 60 degrees, according to standard ASTM D 523.

2. The method according to claim 1, wherein the gloss difference amounts to from about 20 to 60, as measured under an angle of 60 degrees.

3. The method according to claim 1, wherein the gloss difference between the first regions and the second regions on the coated paper amounts to not less than 25, measured under an angle of 85 degrees, according to standard ASTM D 523.

4. The method according to claim 3, wherein the gloss difference amounts to from about 30 to 80, as measured under an angle of 85 degrees.

5. The method according to claim 1, wherein the gloss difference between the first regions and the second regions on the coated paper amounts to not less than 25, measured under an angle of 85 degrees, according to standard ASTM D 523.

6. The method according to claim 5, wherein the gloss difference amounts to from about 30 to 80, as measured under an angle of 85 degrees.

7. The method according to claim 1, wherein the polyolefin coating mass forming said film comprises polyethylene and a pigment.

8. The method according to claim 7,
wherein the pigment is selected from a member of the group consisting of titanium dioxide, carbon black, cobalt blue, other colorants, and mixtures thereof.
9. The method according to claim 8,
wherein the amount of titanium dioxide is from 0 to 15 weight-percent of the polyolefin coating mass.
10. The method according to claim 1,
wherein the polyolefin coating mass forming said film comprises polypropylene and a pigment.
11. The method according to claim 10,
wherein the pigment is selected from a member of the group consisting of titanium dioxide, carbon black, cobalt blue, other colorants, and mixtures thereof.
12. The method according to claim 11,
wherein the amount of titanium dioxide is from 0 to 15 weight-percent of the polyolefin coating mass.
13. The method according to claim 1,
wherein the application amount of the polyolefin coating weight amounts to from about 20 to 60 g/sq.m.
14. The method according to claim 1,
wherein the height level difference measured at the surface of the cylinder roll amounts to from about 3 to 6 micrometers.
15. A method for the marking or printing of the back side of a polyolefin-coated imaging base paper,
wherein a polyolefin coating mass is brought as a film through a nip between a chill cylinder roll with patterns or symbols etched into the surface of the chill cylinder roll and a pressure roll onto the surface of the raw-base paper and simultaneously an image of the surface structure of the chill cylinder roll is obtained,
wherein a height level difference and a gloss difference exists between the chill cylinder roll surface, on the one hand, and the patterns or symbols etched or engraved onto the chill cylinder roll surface, on the other hand, whereby the height-level difference, measured at the chill cylinder roll, amounts to from about 3 to 8 micrometers, and where the gloss difference is expressed by a gloss difference between the patterns stamped into the polyolefin coating of the base paper and the area of the coating surrounding the patterns or symbols, and where the higher disposed surface parts of the chill cylinder roll are always associated with a higher gloss,
wherein the gloss difference between the coated surface and the patterns or symbols stamped thereon, amounts to not less than 15, measured with a measuring head with an angle of 60 degrees, or to not less than 25, measured under an angle of 85 degrees, according to standard ASTM D 523.
16. The method according to claim 15, wherein the gloss difference is in a region of from 20 to 60, as measured under an angle of 60 degrees, or in the region of 30 to 80, as measured under an angle of 80 degree.
17. The method according to claim 15,
wherein the polyolefin coating mass contains at least a polyethylene or a polypropylene and a pigment.
18. The method according to claim 17,
wherein the polyolefin coating mass contains at least a pigment selected from a member of the group consisting of titanium dioxide, carbon black, cobalt blue, other colorants, and mixtures thereof.
19. The method according to claim 18,
wherein the amount of titanium dioxide is from 0 to 15 weight-percent of the polyolefin coating mass.
20. The method according to claim 15,
wherein the application amount of the polyolefin coating weight amounts to from about 20 to 60 g/sq.m.
21. An apparatus for marking a back side of a polyolefin-coated imaging base paper comprising
a machine frame;
a supply roller providing continuous raw-base paper;
a pressure roll mounted onto the machine frame;
a chill cylinder roll mounted on the machine frame, with patterns or symbols etched into the surface of the chill cylinder roll, where a height level and chill cylinder roll surface structure difference exists between the chill cylinder roll surface, on the one hand, and the patterns or symbols etched or engraved onto the chill cylinder roll surface, on the other hand, whereby the height-level difference, measured at the chill cylinder roll, amounts to from about 3 to 8 micrometers, where the chill cylinder roll is disposed on the frame in parallel to the pressure roll thereby forming a nip between the pressure roll and the chill cylinder roll;
a winding roller disposed in parallel relative to the chill cylinder roll for pulling raw base paper from the supply roller through the said nip between the pressure roll and the chill cylinder roll and for bringing a polyolefin coating mass as a film through said nip between the chill cylinder roll and the pressure roll onto the back surface of the raw base paper not to be covered with light sensitive layers for generating simultaneously an image of the surface structure of the chill cylinder roll on the polyolefin coating, and where the chill cylinder roll surface structure difference causes a gloss difference of the coated paper between areas corresponding to the pattern on the chill cylinder roll surface and the surrounding areas of the chill cylinder roll surface, and where this gloss difference, between the patterns stamped into the polyolefin coating of the base paper and the area of the coating surrounding the patterns or symbols, is such that the higher disposed surface areas of the chill cylinder roll have a structure resulting in generation of a higher gloss level in first regions on the coated paper as compared to second regions of the coated paper corresponding to the lower disposed surface areas of the chill cylinder roll;
wherein the gloss difference between the first regions and the second regions on the coated paper amounts to not less than 15, as measured with a measuring head under an angle of 60 degrees, according to standard ASTM D 523.
22. A method for the marking or printing of a back side of a polyolefin-coated imaging base paper, comprising bringing a polyolefin coating mass as a film through a slot between a chill cylinder roll, with patterns or symbols etched into the surface of the chill cylinder roll, and a pressure roll onto the surface of the raw base paper to form a coated base paper, simultaneously obtaining an image of the surface structure of the chill cylinder roll on the coated base paper,
wherein the patterns or symbols are not closely spaced and have an extended surface, and wherein a height level difference and a gloss difference exists between the chill cylinder roll surface, on the one hand, and the patterns or sumbols' surface etched or engraved onto the chill cylinder roll surface, on the other hand, whereby the height level difference, measured at the chill cylinder roll, amounts to from about 3 to 8 micrometers, and where the gloss difference is expressed by a gloss difference between the patterns stamped onto the polyolefin coating of the base paper and the area of the coating surrounding the patterns or symbols, and where the higher disposed surface parts of the chill cylinder roll are always associated with a higher gloss, wherein the gloss difference between the coated surface and the patterns or symbols stamped thereon, amounts to not less than 15, measured with a measuring head with an angle of 60 degrees, or to not less than 25, measured under an angle of 85 degrees, according to standard ASTM D 523.

23. A method for marking or printing onto a back side of a polyolefin-coated imaging base paper, comprising mounting a pressure roll onto a machine frame;

mounting a chill cylinder roll, with patterns or symbols etched into the surface of the chill cylinder roll, where a height level difference and a chill cylinder roll surface structure difference exits between the chill cylinder roll surface, on the one hand, and the patterns or symbols etched or engraved onto the chill cylinder roll surface, on the other hand, whereby the height-level difference, measured at the chill cylinder roll, amounts to from about 3 to 8 micrometers, onto the machine frame to be disposed in parallel to the pressure roll, thereby forming a nip between the pressure roll and the chill cylinder roll;

passing raw base paper through the said nip between the pressure roll and the chill cylinder roll;

bringing a polyolefin coating mass as a film through said nip between the chill cylinder roll and the pressure roll onto the back surface disposed opposite to the surface to be covered with light sensitive layers of the raw-base paper for generating simultaneously an image of the surface structure of the chill cylinder roll on the polyolefin coating, and where the chill cylinder roll surface structure difference causes a gloss difference of the coated paper between areas corresponding to the pattern on the chill cylinder roll surface and the surrounding areas of the chill cylinder roll surface and where this gloss difference between the patterns, stamped into the polyolefin coating of the base paper and the area of the coating surrounding the patterns or symbols, is such that the higher disposed surface areas of the chill cylinder roll have a structure resulting in generation of a higher gloss level in first regions on the coated paper as compared to second regions of the coated paper corresponding to the lower disposed surface areas of the chill cylinder roll, wherein the gloss difference between the first regions and the second regions on the coated paper amounts to not less than 15, as measured with a measuring head under an angle of 60 degrees, according to standard ASTM D 523.

* * * * *